June 22, 1965 CHUN-YI TANG 3,190,675
WIDE-RIMMED, SEATLESS UNICYCLE
Filed June 28, 1963 2 Sheets-Sheet 1
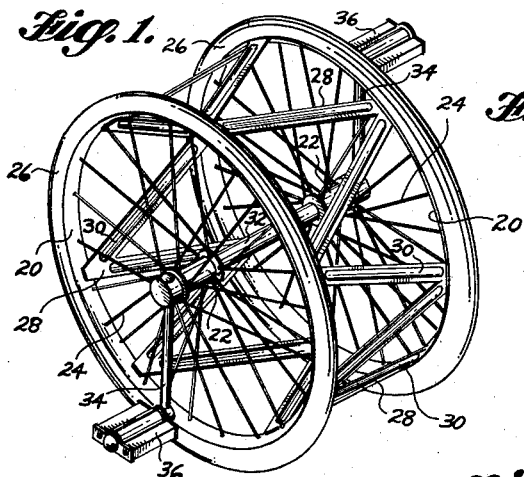
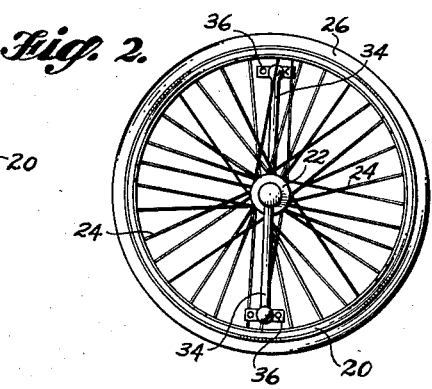
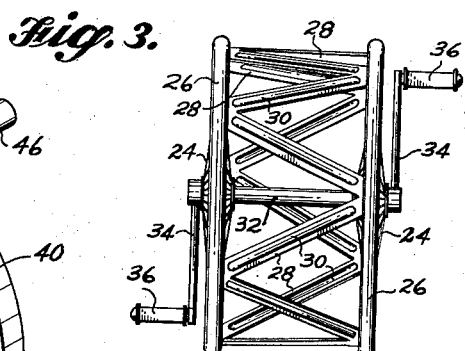
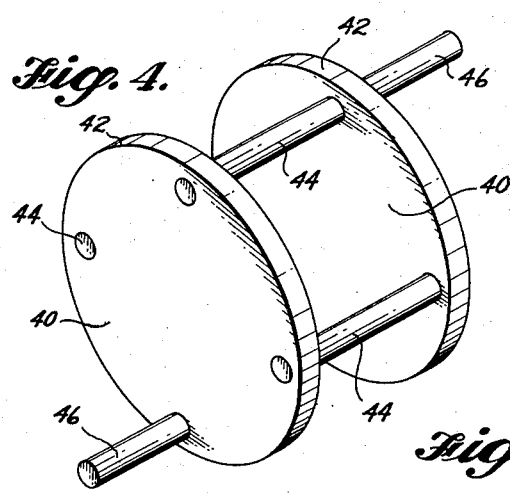
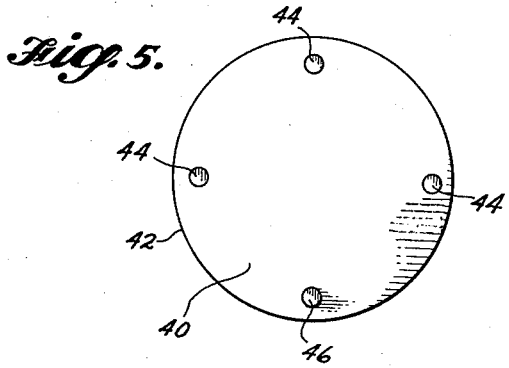
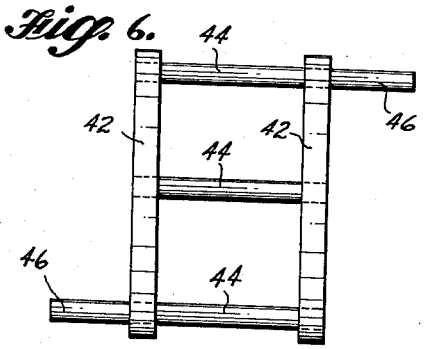
INVENTOR.
CHUN-YI TANG
BY Mattis and Graybeal
ATTORNEYS June 22, 1965 CHUN-YI TANG 3,190,675
WIDE-RIMMED, SEATLESS UNICYCLE
Filed June 28, 1963 2 Sheets-Sheet 2
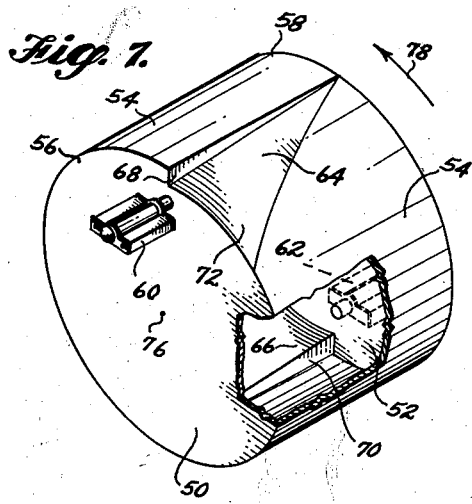
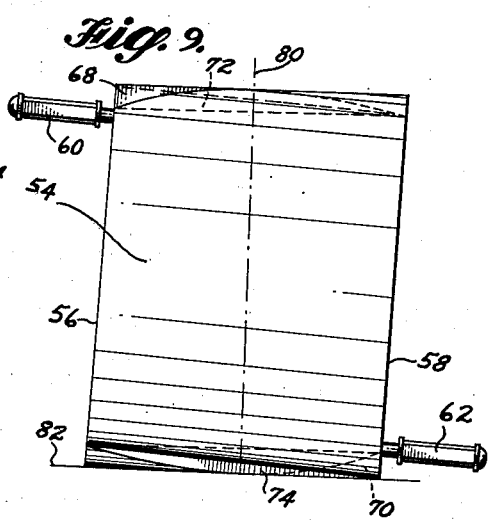
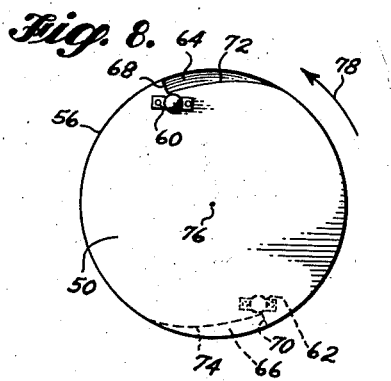
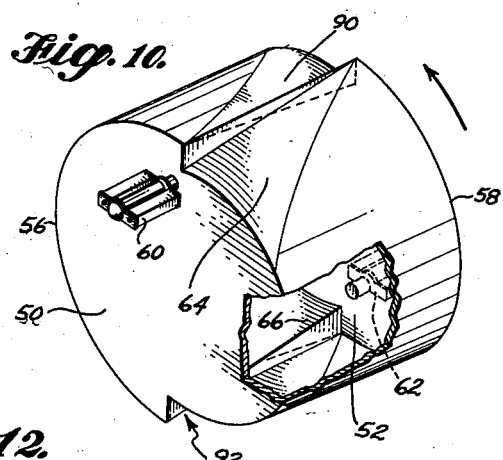
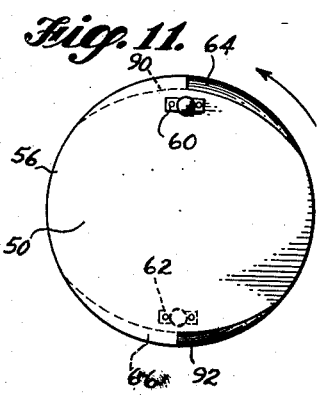
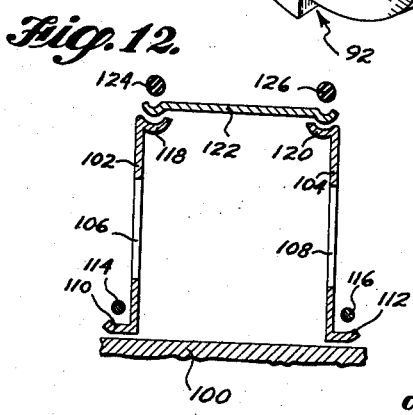
INVENTOR.
CHUN-YI TANG
BY Mattus and Graybeal
ATTORNEYS United States Patent Office 3,190,675
Patented June 22, 1965

3,190,675
WIDE-RIMMED, SEATLESS UNICYCLE
Chun-Yi Tang, P.O. Box 3272, International Station,
Seattle 14, Wash.
Filed June 28, 1963, Ser. No. 292,213
18 Claims. (Cl. 280—221)

This application is a continuation-in-part of my co-pending application Serial No. 141,392, bearing the same title, and filed September 28, 1961, now abandoned.

The present invention pertains to unicycles and particularly to seatless, laterally stable, steerable unicycles characterized by what may be termed a drum type configuration, with a generally cylindrical rim configuration and with offset pedal means disposed outboard of the rim edges.

Conventional narrow-rimmed unicycles require a seat for lateral stability because the span of the pedals laterally is much wider than the rim. Laterally considered, unicycles according ot the present invention are essentially self-stabilizing, with a wide rim and with an outboard pedal span only slightly greater than the rim, so that the conventional seat can be dispensed with. Notwithstanding the absence of a seat, the drum type unicycle is relatively more safe and easier to ride, so that such can be used safely and enjoyably by relatively small children. Notwithstanding its wide-rimmed configuration, unicycles according to the present invention are steerable, in contrast to certain unicycle designs incorporating inboard pedal means.

Moreover, unicycles according to the present invention are of simple and economical construction, are nevertheless rugged and durable in use, and are readily adapted to use as training and exercise devices to improve balance and dexterity.

In certain forms, unicycles according to the present invention optionally and advantageously incorporate rim inset portions to render such self-tilting when the pedals are near top center and bottom center. In one modification, trailing inset or cut out rim portions or sectors are provided on the rim edges adjacent to the pedals to throw the oppositely situated top pedal more near the vertical center plane to enhance user stability during the initial arc of movement of the top pedal toward the supporting surface, i.e., as initiation or propelling foot pressure on the top pedal occurs. In another modification of the unicycle, and in addition to trailing inset sectors, there are also provided leading inset sectors on the rim edges laterally opposite to the pedals, to tilt the drum in favor of more clearance vertically above the lower pedal so propelling foot pressure can be exerted thereon more positively during the last arc of its approach toward the supporting surface.

These and other objects, features, advantages and characteristics of unicycles according to the present invention will be apparent from the following specific description of certain typical and therefore non-limitive embodiments thereof, taken together with the accompanying illustrations of certain such embodiments, wherein like numerals refer to like parts, and wherein:

FIG. 1 is an isometric view of an embodiment of the drum-type unicycle wherein the drum-like configuration is composed of spoked wheels laterally joined by rim-connected braces;

FIG. 2 is a side view of the unicycle shown in FIG. 1;

FIG. 3 is an end view of the unicycle shown in FIGS. 1 and 2;

FIG. 4 is a modified form of drum-type unicycle characteristic of the invention, wherein the drum-like configuration is comprised of two parallel, circular plates or disks, joined by bars or dowels, two of which extend outboard of the plates or disks to constitute the pedal means;

FIG. 5 is a side view of the unicycle shown in FIG. 4;
FIG. 6 is an end view of the unicycle shown in FIGS. 4 and 5;
FIG. 7 is an isometric view, with certain portions broken away, of a further modified form of unicycle characterstic of the invention, with its drum-like configuration being formed of continuous, joined sides and rim surfaces, and with trailing rim inset sectors;
FIG. 8 is a side view of the unicycle shown at FIG. 7;
FIG. 9 is an end view of the unicycle shown at FIGS. 7 and 8, and illustrates a tilting mode thereof;
FIG. 10 is an isometric view of a further modified form of unicycle, similar to that shown at FIGS. 7–9, and further incorporating leading inset sectors in the rim configuration;
FIG. 11 is a side view of the unicycle shown at FIG. 10; and
FIG. 12 is an exploded, planar view along a radius of a still another alternate form of drum type unicycle construction.

The embodiment of drum type unicycle shown at FIGS. 1–3 comprises a parallel pair of wheels comprising rims 20 and hubs 22 interconnected by spokes, certain of which are indicated at 24, in a manner conventional per se as in bicycle and tricycle spoked wheel design, with hard rubber or pneumatic tire means 26 mounted on each of the rims 20, in a manner also conventional per se. Wheel means 20–26, such are interconnected by a series of struts or bracing members, certain of which are indicated at 28, which are preferably ribbed for strength as by upset ridges or grooves 30, and preferably arranged in what may be termed a zig-zag or staggered pattern, for structural rigidity, as shown. The ends of said struts 28 are structurally integrated with rims 20, as by welding or riveting.

The two wheel assemblies 20–26 are also structurally integrated by center axle or shaft 32, non-rotatively mounted in hubs 22 as by being keyed thereto. Said shaft 32 nonrotatively mounts at the ends thereof outboard of the wheels 20–26 a pair of oppositely offset crank arms 34, each terminating in a rotatable foot pedal 36, which pedals 36 can be of a type conventional per se, as commonly employed on bicycles and tricycles, and extend laterally outboard of the rim edges, i.e., outwardly of said edges in directions parallel to the axis of rotation of the unicycle.

As will be seen in FIGS. 1–3, the structurally integrated arrangement of the wheels 20–26 with struts 28 and axles 32 provides a strongly braced, essentially drum type configuration, wherein the tires 26 of the wheels are termable drum edges or rim edges, which rim edges contact the ground simultaneously and are relatively widely spaced with respect to each other. As apparent, the drum body is characterized by an essentially cylindrical pattern or layout of struts 28 defining a rim configuration and by essentially parallel wheels 20–26 which define what may be termed drum ends or drum faces.

An important consideration with respect to unicycles embodying the invention is the height and width (i.e., track span) thereof. As to height, consistent with the seatless nature of the unicycle and the requirement that the operator on occasion be able to laterally tilt the unicycle slightly for steering purposes, the unicycle is designed to be of a height about knee-high of the operator, i.e., about 16–24 inches for adults and about 12–20 inches for children. As to width, the rim edges are spaced apart a distance of at least about one-quarter and preferably at least about one-half of the diameter of the rim edges. Thus, for example, the illustrative embodiment shown in FIGS. 1–3 has a height of 22 inches and a rim width of about 40% of the drum diameter, i.e., about 8¾ inches. To show typical width-to-height ratios, the accompanying drawings of various unicycles embodying the invention are drawn substantially to scale.

Evident from FIGS. 1–3 is the arrangement of the pedal means 36 outboard of the rim edges presented by tires 26, and arrangement of such pedal means 36 at a radius of offset from the axis of rotation coincident with the longitudinal axis of axle 32 by a distance slightly less than the radial dimension of the rim edges. This correlation of the pedal offset to be slightly less than the rim edge radius is important to the unicycle operation, in that steering of the unicycle is best accomplished by applying foot pressure to a pedal when in lowermost position while releasing foot pressure on the then upper pedal, to the point where the unicycle is tipped and the rim edge 26 opposite the lower pedal is raised slightly off the ground, after which by a twisting motion of the body the rider can change the direction in which the cycle faces, i.e., steer. In such momentary tipped or tilted situation, it is desirably for operator stability to have some limitation on the extent of tilt. Such limitation is manifested by the outer tip of the then lowermost pedal 36 touching the supporting surface with the rim edge portion contiguous thereto. Accordingly, in lowermost position the pedal means 36 are positioned to come close to but pass just above the supporting surface, in the normal use attitude of the unicycle, i.e., when both rim edges 26 are in contact with the supporting surface.

FIGS. 4, 5 and 6 illustrate a modified form of drum-type unicycle wherein the drum-like configuration simply involves two parallel, circular plates or disks 40, presenting widely spaced, parallel rim edges 42, the said plates or disks 40 being structurally joined by a series of interconnecting bars or dowels 44, four being shown by way of example, two opposed bars or dowels 44 being extended oppositely outboard of plates or disks 40 to provide outboard pedal means 46, as shown.

In the form of the invention shown at FIGS. 4–6, the span of rim edges 42 is characteristically about half the diameter of plates or disks 40, specifically about 55% of the dimension of such diameter, said FIGS. 4–6 being substantially to scale in this respect.

FIGS. 7–9 show yet another form of unicycle incorporating the basic drum-like configuration according to the present invention, and further having what may be termed trailing inset sectors to augment user stability during the initial arcs of movement of the pedals toward the ground.

More specifically, and to also show further constructional variation as to the physical form of unicycles typifying the invention, the unicycle shown at FIGS. 7–9 comprises parallel, continuous end walls 50, 52, and a laterally wide, generally cylindrical, continuous rim wall 54 spanning said end walls 50, 52, the lateral dimension of rim wall 54 between the rim edges 56, 58, and being over half the diameter of the end walls 50, 52, specifically about 75% of the end wall diameter, said FIGS. 7–9 being substantially to scale in this regard. Pedal means 60, 62 mount directly on respective end walls 50, 52 in this embodiment, in offset, outboard, diagonally opposed arrangement, as shown. The end walls 50, 52 and rim wall 54 are externally configured to have oppositely arranged and oppositely directed inset sectors 64, 66, presenting respective inset brake segments 68, 70 substantially on the diametric plane of pedals 60, 62 (note FIG. 8), which brake segments 68, 70 are joined by panels 72, 74, of curved, triangular shape which panels 72, 74 function to gradually return the trailing radius of rim edges 56, 58, to the maximum rim dimension about the axial center 76 of the end walls 50, 52.

When the unicycle shown at FIGS. 7–9 is propelled in the direction of rotation shown by the arrow designated 78, and as either of pedals 60, 62 proceeds from a forward position downwardly toward the supporting surface, the rotation is in what may be termed a non-tilted manner. However, as a given pedal, say pedal 62, reaches the point where the diametric plane of the pedals 60, 62 is vertical with respect to the supporting surface, then the next extent of rotation of the drum causes the drum to tilt slightly, with the contact of the drum with respect to the supporting surface being shifted to the right-angle point of inset segment 70, and a point or line on the panel 74 connected with said inset segment 70, so that the angle of rim edge 58 is slightly less than 90° with respect to the supporting surface, and the angle of drum edge 56 is slightly greater than 90° with respect to the supporting surface, as shown at FIG. 9. FIG. 9 also presents for purposes of illustration an imaginary center plane 80 which is vertical to the supporting surface 82 and extends in the direction of movement of the unicycle, to show such tilting action when pedal 62 is at its closest approach point and tilted with respect to the supporting surface.

This action of a slight lateral tilt in favor of increasing the angle of the rim edge (e.g., 56 as shown at FIG. 9), to establish the angle thereof with respect to the supporting surface as slightly more than 90°, is important to user stability in that such tilting throws the then uppermost pedal 60 slightly toward the center plane 80 so that as pressure is exerted on said pedal 60 during the initial portion of its downward movement toward the supporting surface 82, the downward pressure on the pedal can be more readily counterbalanced by a balancing pressure on the other pedal 62, until such a time as the further rotation of the drum brings the lower pedal substantially away from the supporting surface. After substantial further rotation of the drum, the non-tilted attitude of the drum with respect to the supporting surface is restored by the drum rolling the inset panel 72 out of contact with the supporting surface, after which the non-tilted attitude is maintained until the opposite pedal passes contact center, after which an opposite tilting action takes place, with continuing rotation cyclically repeating the lateral tilting action first to one side and then to the other.

FIGS. 10 and 11 illustrate a further variation in tilting sector design, and in this form the drum incorporates what may be termed leading inset sectors as well as the trailing inset sectors of the unicycle shown at FIGS. 7–9. Such leading inset sectors are associated laterally opposite of the respective pedals 60, 62, as generally designated at 90 and 92. Except for the modification to incorporate said leading sectors 90, 92, this form of unicycle is identical with the form thereof shown at FIGS. 7–9.

The respective drum ends 50, 52 on which pedals 60, 62 are mounted are tilted by the leading sectors 90, 92 in favor of increasing the angle of said ends 50, 52 to slightly more than 90° with respect to the supporting surface as the respective pedals 62, 60 approach their lowermost positions with respect to the supporting surface. Such tilting tends to provide more clearance vertically above the then lower pedal, so propelling foot pressure is exerted thereon more positively during the last arc of its approach toward the supporting surface. As will be understood, the manner of operation of the form of drum type unicycle shown at FIGS. 10 and 11 involves four lateral tilts per revolution, while the form thereof shown at FIGS. 7–9 involves two lateral tilts per revolution.

FIG. 12 is an exploded, planar view taken along a radius, showing a further manner of construction for fabricating a unicycle according to the present invention. This construction has the advantage of providing the end wall and side wall pattern of the drum-like configurations from parts which can be simply press-formed and readily assembled. Specifically in connection with an offset pedal mounting axle 100, similar to the axle 32 of the unicycle shown at FIGS. 1–3, the end walls can be formed from sheet metal stock and configured to have radially extending panel portions 102, 104 with cut-outs 106, 108 in the form of slots or holes, as desired, to lighten the drum. The inner extent of such panels 102, 104 are hooked outwardly as at 110, 112 to be clamped to axle 100 by clamp rings 114, 116. At the outward extent of said panels 102, 104, they are inwardly turned as at 118, 120, to receive a cylindrical configured rim panel 122, the assembly of rim panel 122 to end panels 102, 104 being simply accomplished as by a weld applied along the bead between the outer corner of each panel 102, 104 and the edges of rim panel 122. Then, rim edge presenting rubber or like rings 124, 126 are nested in the inset end portions of rim panel 122, to complete the assembly.

Each illustrated form of the invention includes interiorly open bracing means arranged between the wheels or end walls, substantially at or somewhat inset from the rim edges, for laterally bracing the unicycle in the vicinity of the rim edges, especially during tipping of the unicycle, such as while steering. Specifically, for example, such bracing means consists of the ribbed struts or bracing members 28 (FIGS. 1–3), the bars or dowels 44 (FIGS. 4–6), rim walls 54 (FIGS. 7–11), and rim panel 122 (FIG. 12).

As will be evident, any suitable constructional material or materials can be employed in the fabrication of the unicycles shown. Thus, and while the form of FIGS. 1–3 is suitably constituted of wheels conventional per se with metal struts necessarily provided for strength, the form shown at FIGS. 4–6 can be fabricated from wood, metal, or plastic, and the forms shown at FIGS. 7–12 can be of metal or reinforced plastic, at least as to the drum configuration forming components. Evident also will be the proposition that in any given configuration, internal bracements can be incorporated, as well as any desired variation in material thicknesses, to provide appropriate strength consistent with desired weight. Various detail features of various forms can be incorporated with respect to other forms. Thus, for example, any of the forms of the invention shown at FIGS. 4–12 can incorporate rim and/or end arranged lightening cutouts such as slots or holes 106, 108 in FIG. 12. Also, the forms of the invention shown at FIGS. 7–11 can be constructed without inset sectors, simply by way of further example.

Further configuration variations in the generally cylindrical, drum-like configuration of unicycles according to the invention will likewise occur to those skilled in the art, such as where the drum ends are convexed slightly, or where the rim is convexed slightly in the nature of a barrel, for example.

From the foregoing, various further modifications, adaptations, modes of use, and features characteristic of the invention will occur to those skilled in the art to which the invention is addressed, within the scope of the following claims.

What is claimed is:
1. A wide-rimmed unicycle comprising a wide, generally cylindrical rim and substantially parallel ends, the dimension of said rim between the edges thereof being at least about one-quarter the diameter of said ends, said unicycle further comprising pedal means arranged outwardly of said ends in oppositely offset relation to the rotational centers of said ends, and oppositely directed rim inset sectors operating to laterally tilt the drum slightly, with one edge of said sectors lying substantially in a plane including said pedal means.

2. A unicycle according to claim 1, wherein said inset sectors occupy segments of the rim edges which immediately trail said pedal means when the unicycle is rotated in the intended direction of rotation, a trailing rim edge sector being in the rim edge respectively adjacent to each pedal means so that pressure can be more stably applied to an uppermost pedal during its initial arc of movement to the unicycle supporting surfaces.

3. A unicycle according to claim 1, wherein said inset sectors respectively related to each pedal means occupy a segment of the laterally opposite rim edge and are disposed to immediately lead the rotational position of the pedal means when said unicycle rotates in the intended direction of rotation, so as to slightly tilt the drum in a manner providing more clearance vertically above a pedal means during its last arc of approach toward the unicycle supporting surface so propelling foot pressure can be exerted thereon more positively.

4. A unicycle according to claim 1, wherein said sectors comprise rim inset sectors operatively trailing each pedal means and situated in the rim edges respectively adjacent each pedal means, and further comprise rim inset sectors operatively leading each pedal means and situated in the rim edges respectively opposite said pedal means.

5. A drum type unicycle comprising a wide, generally cylindrical rim wall spanning parallel end walls, the dimension of said rim wall between the lateral edges thereof being at least about one-quarter the diameter of said end walls, said unicycle further comprising pedal means mounted on and extending outwardly from said end walls in oppositely offset relation to the rotational axis of said end walls, and triangularly configured rim inset sectors laterally tilting the drum during rotation thereof in a manner augmenting user stability.

6. A unicycle according to claim 5, wherein said inset sectors constitute trailing sectors which tilt the drum slightly just after the pedal means reaches points of closest approach to a supporting surface so that the end wall bearing the then uppermost pedal is tilted slightly toward a vertical center plane extending in the direction of movement of the unicycle at the time pressure is exerted on the then uppermost pedal during the initial portion of its downward movement toward the supporting surface, thereby tending to increase user stability.

7. A seatless unicycle consisting essentially of:
 (A) a generally cylindrical rotary body, having
  (1) substantially parallel ends presenting substantially rigid, generally round, widely spaced rim edges, with the radial dimensions of said body between the rim edges being no greater than the maximum radius thereof at said rim edges, so that said rim edges may simultaneously contact a flat supporting surface and provide lateral stability, the said rim edges being
   (a) about 12–24 inches in diameter, so as to be about knee-high to the rider of the unicycle, and
   (b) spaced apart a distance at least equal to about one-quarter of the maximum diameter of the rim edges; and
  (2) interiorly open bracing means extending between and interconnecting said ends, and rigidly bracing same when the unicycle is laterally tilted onto one rim edge under the weight of the rider; and
 (B) radially and oppositely offset pedal means disposed on said body laterally outboardly of the said parallel ends thereof.

8. A unicycle according to claim 7, wherein the said oppositely offset pedal means are offset from the axial center of the body slightly less than the maximum radius of said rim edges, so as to enable stabilized lateral tipping of the unicycle and the steering thereof by a standing rider.

9. A unicycle according to claim 7, wherein said substantially parallel ends are in the form of parallel plates, and said radially and oppositely offset pedal means are disposed one on each such plate so as to extend laterally outboard thereof and be somewhat radially inset from said rim edges.

10. A unicycle according to claim 9, wherein said bracing means comprise a plurality of bars which are slightly radially inset from said rim edges and structurally join said end plates, extending substantially parallel to said rim edges, with two opposite bars extending outwardly of said plates, each on an opposite side thereof, to provide the said pedal means.

11. A unicycle according to claim 9, wherein said bracing means comprises a generally cylindrically shaped rim plate spanning and affixed to said end plates.

12. A unicycle according to claim 11, wherein said generally cylindrical rotary body comprises a center axle coincident with its axis of rotation, the said end plates being affixed to said center axle by a turned edge portion of the end plates being clamped to said center axle.

13. A unicycle according to claim 11, wherein said end plates comprise turned circumferential edges, and said rim plate comprises turned outer edges, the said rim plate also comprising rolled outer edges, with the rolled edges of the rim plate each being nested in the turned circumferential edges of the end plates.

14. A unicycle according to claim 7, wherein said generally cylindrical rotary body comprises a structurally integrated pair of wheels providing said parallel ends arranged with the wheel rims parallel to each other and with coaxially related center hubs, axle means non-rotatably mounted on said hubs, with the said radially and oppositely offset pedal means including pedal cranks mounted on said axle means outboardly of said hubs.

15. A unicycle according to claim 14, wherein said wheels are of spoked construction.

16. A unicycle according to claim 14, wherein said bracing means comprise bracing members structurally joining said wheel rims.

17. A unicycle according to claim 16, wherein said bracing members extend between said wheel rims in zig-zag pattern.

18. A unicycle according to claim 16, wherein said bracing members are fabricated of sheet metal, with strength increasing ribs extending longitudinally thereof.

References Cited by the Examiner

UNITED STATES PATENTS

| 88,683 | 4/69 | Ward | 280—205 |
|---|---|---|---|
| 490,391 | 1/93 | Libbey | 301—5 |
| 1,225,181 | 5/17 | Schleicher | 152—155 |
| 1,333,292 | 3/20 | Case | 280—259 |
| 2,920,904 | 1/60 | Doud et al. | 280—205 |
| 2,946,625 | 7/60 | Crain et al. | 301—41 |
| 3,107,926 | 10/63 | Verge | 280—205 X |

BENJAMIN HERSH, *Primary Examiner.*

KENNETH H. BETTS, MILTON BUCHLER, *Examiners.*